United States Patent Office 3,550,432
Patented Dec. 29, 1970

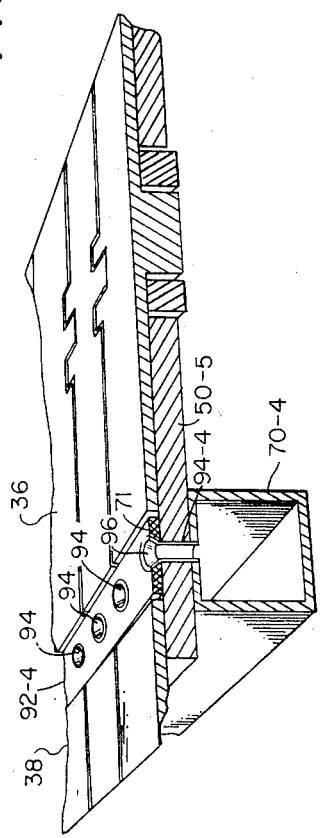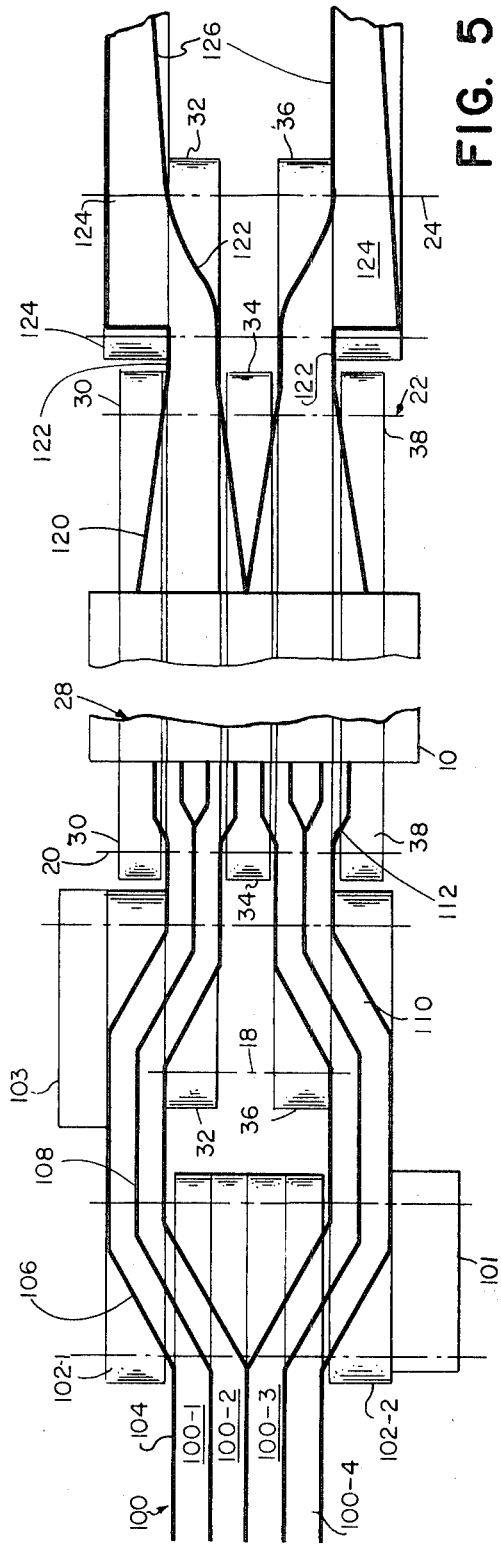

3,550,432
TESTING APPARATUS
Peter H. Gundal, Quincy, and Silvio Albano, Everett, Mass., assignors to The Gillette Company, Boston, Mass., a corporation of Delaware
Filed Mar. 19, 1969, Ser. No. 808,534
Int. Cl. G01m 3/10
U.S. Cl. 73—41.2                                12 Claims

ABSTRACT OF THE DISCLOSURE

Leak test apparatus includes a water-filled tank and a series of endless conveyor belts disposed in parallel relation. A portion of each belt is submerged beneath the surface of the water in the tank and the belts are spaced apart to define gaps between adjacent belts. Elongated orifice structures are disposed in the gaps beneath the plane of the conveyor belts and a pump circulates water in the tank through the gaps between the belts of the orifice structures to produce a pressure differential that holds the articles submerged beneath the surface of the water as they are moved through the tank by the conveyor belts.

---

This invention relates to testing apparatus and more particularly to apparatus for detecting leaks in articles, for example leaks in dispensing packages of the aerosol type that are charged with a propellant under pressure.

Many products are sold in pressurized dispensing packages. The product in the container is dispensed by pressure created by a propellant gas. The container is generally made of metal, such as tin plate, steel or aluminum, but it can be made of non-metallic materials such as plastic or glass. In the manufacture of such dispensers, after the body of the package is filled with a predetermined quantity of the product to be dispensed, a cap in which a valve structure is mounted is sealed to the container. The propellant may be added before the cap is attached to the container, or during the process of attaching the cap, or through the valve device or in some other way after the cap has been attached to the container. Before these pressurized dispensing packages are shipped, they must be tested for leaks. A leak may occur, for example, through the body of the container, through a seam in the container body or the seal between the body and the cap, or through the valve structure. It is essential that the filled, sealed containers be leak-proof and entirely free of any holes, cracks or the like, or weaknesses or imperfections that could possibly develop into holes or other defects if the container is subjected to elevated temperatures. Such packages are usually tested for leaks by submerging each package in a tank of water, the water being heated to raise the pressure inside the package. Each package is observed while it is submerged; and leaks are revealed by bubbles which rise to the surface of the liquid in the test tank. Since such packages have positive buoyancy and tend to float to the surface of the liquid, some means must be provided to hold the packages submerged beneath the surface of the liquid while they are transported through the tank. Means used in the prior art have included a submerged screen or grid beneath which the packages pass; a magnetic mounting plate for receiving a container (suitable for use with containers made of magnetic material); and clamp devices.

It is an object of this invention to provide novel and improved apparatus for testing articles for leaks.

Another object is to provide novel and improved leak test apparatus which transports articles to be tested through a liquid in a leak-test tank in such a way that an observer has an unobstructed view of the articles and can easily detect leaks in any part of the articles by observing bubbles rising from them through the liquid.

Another object is to provide apparatus for transporting pressurized containers through a leak-test tank in such a way that leaking containers may be removed from the tank without difficulty.

Still another object is to provide novel and improved leak test apparatus capable of testing articles of a variety of sizes without modification of the apparatus.

Another object is to provide novel and improved apparatus for transporting through a leak-test tank articles of any kind of material, magnetic or otherwise.

Another object of the invention is to provide novel and improved apparatus for handling and transporting articles to be tested for leakage.

Another object of the invention is to provide an apparatus for transporting objects through a fluid medium in which they are buoyant or tend to move away from the conveyor.

Leak test apparatus constructed in accordance with the invention includes a tank which is adapted to contain a liquid. A conveyer is disposed in the tank for supporting the articles and carrying them submerged beneath the surface of the liquid in the tank for at least a portion of the travel through said tank. A flow generator produces flow of the liquid in the tank to create a force on the articles which holds the articles beneath the surface of the liquid while they are moved through the tank by the conveyer. Any leak in the article is detected by rising bubbles from the defective article.

In particular embodiments the conveyer is arranged so that the liquid may flow through the support surface thereof. A conduit disposed below the support surface of the conveyor extends along the path of article movement by the conveyor through said tank and has flow orifice structure extending along that path. This flow orifice structure may take a variety of configurations but in a preferred embodiment is a series of spaced holes in the wall of the conduit. The liquid in the tank is pumped (by the flow generator) downwardly through the conveyer and creates a pressure differential on articles on the conveyer which holds the articles below the surface of the liquid as the articles are moved through the tank by the conveyer.

In a particular embodiment the conveyer includes two conveyer elements which define a pair of elongated, spaced adjacent edges that extend in the direction in which the articles are to be conveyed through the tank, the edges being separated by a distance smaller than the smallest dimension of the contact surface of the articles to be leak tested, the contact surface being that surface adjacent to the conveyor and at least partly in contact with it when an article is held in place against the conveyor by the force created by the liquid flow. While the unobstructed flow path provided by the spaced conveyer elements is preferred, other conveyer configurations having suitable flow paths through them may also be employed. The conduit structure in this embodiment has a part of its wall lying between the spaced conveyer edges, the outer surface of this conduit wall being spaced slightly below the article contact surface when the article is held against the conveyor. The wall has a plurality of flow passages extending from the outer wall surface to the interior of the conduit, allowing liquid flow past the conveyed article and through the conveyer into the conduit with the result that the pressure on the article surface adjacent to the conduit is reduced so that a pressure differential is created which holds the article against the conveyor so that it is transported by the conveyer through the tank. A suitable pump is employed to maintain the necessary rate and direction of flow of the liquid through the conveyer and conduit.

The testing apparatus in a preferred embodiment of the invention includes a tank of heated water in which pressurized containers are to be tested for leaks, and a series of parallel chain belt conveyers, whose adjacent edges extend in the direction in which the containers are to be conveyed. The edges of pairs of these belt conveyers are separated by a distance smaller than the diameter of the bottom surfaces of the containers so that the containers bridge the gap between the edges. A water conduit beneath the conveyers has an upper surface disposed in the gap between the spaced conveyer edges and about 0.010 inch below the upper (article support) surface of the conveyer belts. A series of spaced cylindrical holes having flared entrances, extend from the plane top surface of the conduit to its interior. A pump recirculates the water in the tank, drawing it past the containers on the conveyer belts through the holes into the water conduit, thus reducing the pressure on the bottom surfaces of the containers so that it is less than the pressure on the rest of the container and the containers are held against the conveyer surfaces as they are moved through the tank.

Thus the invention provides apparatus particularly useful for testing leaks of pressurized dispensing packages and the like. While a particular embodiment of the invention is described hereinafter, a variety of modifications will be apparent. For example, the conveyer may be perforated or otherwise pervious to the requisite liquid flow. Similarly, the conduit flow orifice structure may define a single elongated orifice or a series of elongated orifices. The invention provides a simple, reliable, versatile leak test system. Further objects, features, and advantages will appear from the following description of a particular embodiment of the invention, taken together with the attached drawings, in which:

FIG. 4 is a perspective view of part of the apparatus shown in FIG. 3; and

FIG. 5 is a diagrammatic view showing a system of handling containers at the entrance and exit of the test apparatus shown in FIG. 1.

DESCRIPTION OF PARTICULAR EMBODIMENT

Figure 1:
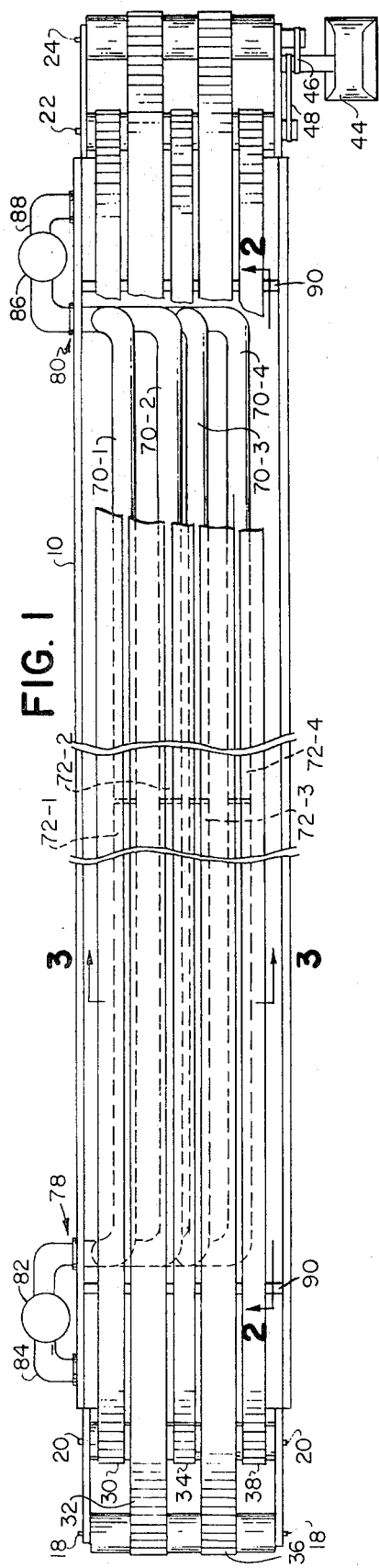
FIG. 1 is a top plan view of a leak test apparatus constructed in accordance with the invention.
Figure 2:
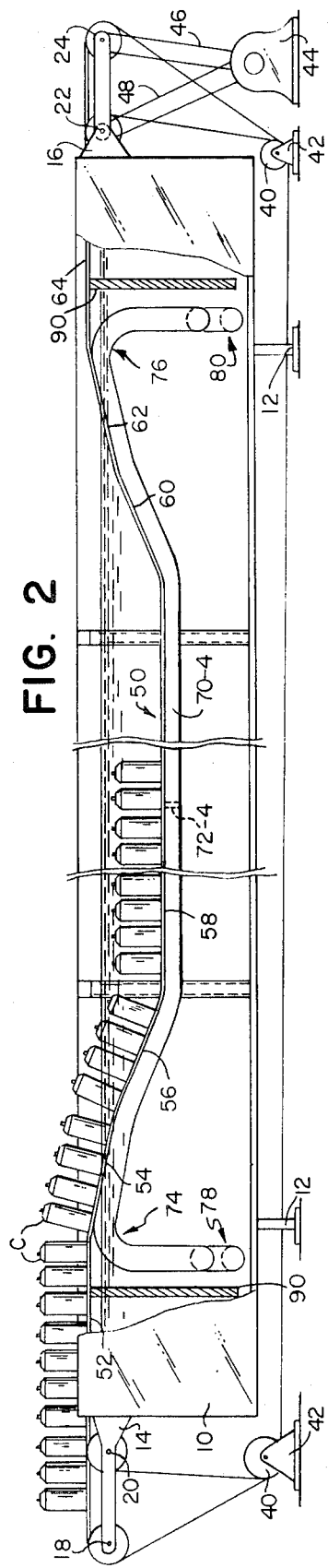
FIG. 2 is a sectional view of the leak test apparatus taken along the line 2—2 of FIG. 1.

As shown in FIGS. 1 and 2, a tank 10 is mounted on appropriate supports 12. Framework structures 14 and 16 at opposite ends of the tank support four shafts which have axes 18, 20, 22 and 24, respectively. Three 3¼ inch wide chain belts 30, 34 and 38 run between axes 20 and 22, and two 6 inch wide chain belts 32 and 36 run between axes 18 and 24. Idler rolls 40 mounted on supports 42 at either end of tank 10 guide the endless chain belts along a return path beneath tank 10. A conveyer belt drive motor system is schematically indicated at 44; the output shaft of motor 44 being coupled through belts 46 and 48 to drive the shafts of axes 22 and 24 which in turn drive all five belts.

Figure 3:
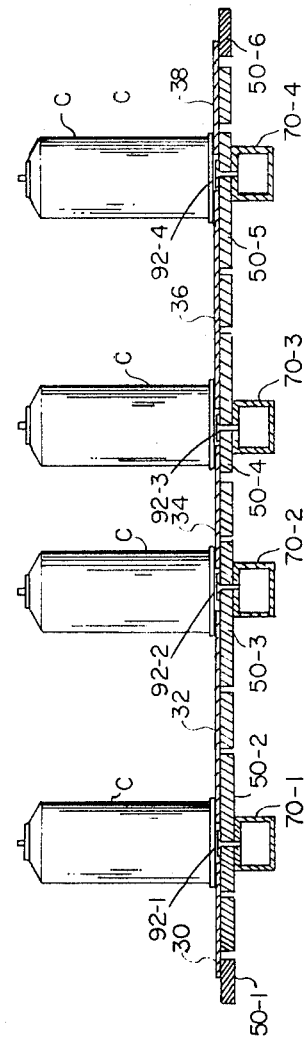
FIG. 3 is a sectional view of a portion of the leak test apparatus taken along the line 3—3 of FIG. 1.

Six guide plate structures 50 (50–1—50–6, as shown in FIG. 3) are disposed inside the tank 10 and support the five chain belts as they pass through the tank. Each plate structure 50 is of similar configuration and has a horizontal entrance section 52; a first descending section 54 forty-four inches long and inclined downwardly at an angle of 5°; a second descending section 56, twenty inches long and inclined downwardly at an angle of 20°; and a horizontal transport section 58, one hundred inches long. The slope of plate structure 50 changes between horizontal section 52 and descending section 54 through a transition curve of ten inches radius; the transition curve between descending sections 54 and 56 has a radius of twenty-two inches, and the transition between descending section 56 and horizontal section 58 has a radius of eighteen inches.

At the output end of the tank, ascending sections 60 and 62, horizontal section 64 and the corresponding transition curves of each plate structure 50 are symmetric with respect to sections 56, 54 and 52, respectively.

A conduit 70 (70–1, 70–2, 70–3, and 70–4) is attached to the lower surface of plate structures 50–2, 50–3, 50–4 and 50–5, respectively, as shown in FIG. 3. The configuration of conduit 70–4 is described, with reference to FIGS. 2 and 4 as it is illustrative the structure of all four conduits.

Conduit 70–4 is a rectangular tube of 2 inch x 2 inch dimension at the center of which is located a barrier 72 that separates the conduit into two sections. Each end 74, 76 of the conduit 70 is connected to a collector system 78, 80, respectively, to which the corresponding ends of the other conduits 70 are connected.

As shown in the enlarged perspective view of FIG. 4 secured on the top surface of corresponding support plate structure 50–5 in alignment with conduit 70–4 is an elongated strip 92–4 whose plane top surface lies 0.010 inch below the surface of conveyor belts 38 and 36. A series of aligned bushings 94, spaced $15/16$ inch on center along the conveyer path as defined by the spaced edges of adjacent belts 36 and 38, extend from the top surface of strip 92–4 through the strip to the interior of manifold 70–4 and define flow ports 96 between conveyer to the conduit. Each port 96 passes through a bushing 94 and is ⅛ inch in diameter with a flared entrance defined by a standard 82° countersink ¹⁄₁₆ inch deep.

A pump 82, which in this embodiment has a capacity of 325 gallons per minute, is powered by a variable speed motor (not shown), pumps the water in a circulating path from the tank downwardly between the conveyer belts and through ports 96 and conduits 70 to collector system 78 and then to pipe 84 which returns the water to the entrance end of tank 10. A similar pump and motor arrangement 86 returns water from collector system 80 to the tank through return pipe 88. Suitable baffling structure, such as plate 90 (which may be perforated) at either end of the tank smooths the flow as the water is returned to the central (conveyer) area of the tank.

FIG. 5 shows apparatus that guides containers C onto conveyer belts 30, 32, 34, 36, 38 for entry into the tank 10 and receives the containers from the conveyers as they emerge from the tank. Four conveyers 100–1—100–4, powered by drive unit 101, carry four lines of containers to be tested toward tank 10. Two transition conveyers 102–1 and 102–2 (each four feet in length and of six inch wide Delrin chain) powered by drive unit 103 are beside and overlap the last portions of the conveyer units 100 and similarly beside and overlap the entrance portions of the six inch conveyer chains 32 and 34. A series of five parallel guide walls 104 (spaced three inches apart) align the containers arriving on conveyers 100 into four rows, and guide these rows into transfer sections defined by guide walls 106 that are at an angle of 30° to walls 104. Two rows of containers thus are transferred onto each transition conveyer 102. The containers are moved along conveyers 102 through sections 10, and a second set of transfer sections defined by walls 110 then guide the containers from transition conveyers 102 onto the tank transport conveyer 32 and 36—two lanes of cans C on each conveyer. Upon reaching the three 3¼ inch tank transport conveyers 30, 34 and 38, the two lanes of containers on each conveyer 32 and 36 are positioned by guide walls 112 in bridging relation to a six inch conveyer 32 or 36 and an adjacent narrower conveyer 30, 34 or 38 so that each lane of cans is supported during its travel through tank 10 by the adjacent spaced edges of a pair of conveyer chains, 30 and 32, 32 and 34, etc. The cans are guided onto each such pair of conveyer chains such that the bottom of each can overlaps both conveyers about the same amount and thus is supported for movement through tank 10.

At the exit end of tank 10, angled guide walls 120 merge the four lanes of cans into two lanes, carried by the six-inch conveyers 32 and 36. Transition guide walls 122 then transfer the cans to auxiliary conveyers 124, which lie beside and overlap the ends of tank conveyers 32 and 36, and guide walls 126 gradually merge the cans as they are moved by conveyers 124 into two single lanes for further processing.

In operation, water, maintained at a suitable temperature, typically within the range 110–170° F., fills tank 10 to within a few inches below the level of horizontal conveyer sections 52, 64; overflow pipes, preferably telescopically adjustable to allow variation of water level, control the water level in the tank. The water level is usually chosen to be a few inches above the tops of the containers as they travel over the lower testing conveyer section 58.

Four lanes of containers to be tested are transferred from input conveyer system 100 to the tank conveyer system 28 via transition conveyer system 102 and travel horizontally over section 52 of system 28 (see FIG. 2) before entering the water in tank 10. Since the pressurized dispensing packages C are made of relatively light material and are partly filled with a propellant gas, the buoyant force of the water, as the containers are carried downward along sections 54 and 56, becomes greater than the force of gravity holding the cans against the conveyers, and they tend to float away. However, the water in the tank is constantly drawn by pumps 82, 86 through the conveyer system 28 into ports 96 and conduits 70 at a flow rate that creates a sufficient reduction in pressure under the lower surface of each package C, commencing at section 54 as the cans start to enter the water and continuing through section 62 until the cans have left the water, so that the packages are held in contact with the surfaces of the conveyer system 28 while in the water enabling the conveyers to carry them through tank 10.

The cans thus are submerged as they travel through tank 10, and an observer can easily detect any leaks in them by seeing bubbles rising through the water, since there is no structure to obscure the view of the cans. Leaking containers may also be easily removed from the tank, since no structure interferes with grasping the cans. The force applied to the articles to hold them submerged may be proportioned to the depth of the water by graduating the flow conditions for example by varying the number or size of the ports 96 or the configuration of the conduits 70. Different flow conditions may be employed at different sections of the conveyer system.

Therefore, while a preferred embodiment of the invention has been shown and described, modifications thereof will be apparent to those skilled in the art, and it is not intended that the invention be limited to the described embodiment or to details thereof and departures may be made therefrom within the spirit and scope of the invention as defined in the claims.

What is claimed is:

1. Apparatus for testing articles for leaks by submerging the article in a liquid comprising
   a tank adapted to contain said liquid,
   a conveyer for supporting the articles and carrying them submerged beneath the surface of the liquid in the tank for at least a portion of the travel through said tank,
   and a flow control system for directing flow of the liquid in said tank to create a force on the articles to hold the articles below the surface of the liquid and in contact with the conveyer so that the conveyer moves the articles through the tank while facilitating detection of leaks by observing bubbles rising from defective articles.

2. The apparatus claimed in claim 1 wherein said conveyer defines a plane surface on which said articles rest and includes flow passages so that the flow of liquid produced by said flow control system passes through said surface of said conveyer.

3. The apparatus as claimed in claim 2 wherein said flow control system includes orifice structure extending along the conveyer path and immediately below said conveyer surface so that the pressure on the article surface, a portion of which is in contact with said conveyer surface, is reduced due to the liquid flow conditions produced by said flow control system.

4. The apparatus as claimed in claim 3 wherein said conveyer has a pair of spaced adjacent edges extending in the direction in which the articles are to be conveyed, separated by a distance smaller than the smallest dimension of the contact surface of the article to be tested for leakage.

5. Apparatus for testing articles for leakage comprising a tank adapted to be filled with liquid,
   conveyer means for supporting the articles and carrying them submerged beneath the surface of the liquid in the tank for at least a portion of the travel through said tank, said conveyer means having flow passage means for liquid flow through said conveyer.
   conduit structure including flow orifice means immediately below the support surface of said conveyer means and extending along the path of article movement by said conveyer means through said tank, and means to force the liquid downwardly through said conveyer to create a force on articles on said conveyer means to hold the articles below the surface of the liquid as the articles are moved through the tank by said conveyer means.

6. The apparatus as claimed in claim 5 wherein said conveyer means has a pair of spaced adjacent edges extending in the direction in which the articles are to be conveyed, separated by a distance smaller than the smallest dimension of the contact surface of the article to be tested for leakage.

7. The apparatus as claimed in claim 6 wherein said conduit structure has a part of its wall lying between said spaced conveyer edges, the outer surface of said conduit wall being adjacent to but spaced from the article contact surface when the article is held against the conveyer, and said flow orifice means including a series of passages extending through said conduit wall to the interior of the conduit, allowing liquid flow past the conveyed article into the conduit.

8. The apparatus as claimed in claim 5 in which said means to force the liquid includes a pump coupled between said conduit structure and said tank for circulating the liquid in the tank along a path through said conveyer and said flow orifice means into said conduit structure.

9. Apparatus for testing articles for leaks by submerging the articles in a liquid comprising
   a tank adapted to contain said liquid,
   conveyer structure comprising a plurality of endless belts disposed in parallel relation,
   at least a pair of said belts being spaced apart to provide a pair of edges extending in the direction in which the articles are to be conveyed through the tank,
   said pair of edges defining a gap of width smaller than the width of the article surface to be in contact with the conveyer structure,
   said conveyer structure being arranged to support the articles and carry them submerged beneath the surface of the liquid in the tank for at least a portion of the travel of the articles through said tank,
   orifice structure aligned with said gap between said pair of belts and extending along the conveyor path spaced below the support surface of said conveyer belts,
   and a pump for circulating the liquid in said tank through the gap between said belts and said orifice structure to produce a condition of reduced pressure beneath the contact surface of the articles so that a pressure differential holds the articles on the conveyer structure as they are moved through the tank by the conveyer structure.

10. The apparatus as claimed in claim 9 and further including a support structure for said plurality of endless belts, said support structure defining a conveyer path through said tank and conduit structure secured to said support structure, said orifice structure being formed in a wall of said conduit structure and including a series of ports extending through said conduit wall so that said pump circulates liquid past said conveyer structure and through said ports into said conduit structure.

11. The apparatus as claimed in claim 9 wherein said support structure defines descending transition, an ascending transition and a horizontal section between said entrance and exit transitions where the article to be tested is held beneath the surface of the liquid so that leaks may be detected by observing bubbles rising through the liquid from defective articles.

12. The apparatus as claimed in claim 9 and further including an input conveyer, a transition conveyer, and guides cooperating with said input and transition conveyers for positioing articles to be leak tested in bridging relation over the gap between said pair of belts.

References Cited

UNITED STATES PATENTS

| | | | |
|---|---|---|---|
| 369,539 | 9/1887 | Mann | 73—41.2 |
| 683,679 | 10/1901 | Case | 73—41.3 |
| 1,433,284 | 10/1922 | Johnson et al. | 73—41.2 |
| 3,350,919 | 11/1967 | Mucci et al. | 73—41.2 |
| 3,461,716 | 8/1969 | Thomson | 73—45.1 |

LOUIS R. PRINCE, Primary Examiner

HARRY C. POST III, Assistant Examiner

U.S. Cl. X.R.

198—184